(12) United States Patent
Kloucek

(10) Patent No.: US 12,467,521 B1
(45) Date of Patent: Nov. 11, 2025

(54) 3D-PRINTED TELESCOPING ACTUATOR

(71) Applicant: YARRO STUDIOS, INC., Orem, UT (US)

(72) Inventor: Thomas Kloucek, Walpole, MA (US)

(73) Assignee: Yarro Studios, Inc., Orem, UT (US)

( * ) Notice: Subject to any disclaimer, the term of this patent is extended or adjusted under 35 U.S.C. 154(b) by 0 days.

(21) Appl. No.: 18/660,462

(22) Filed: May 10, 2024

(51) Int. Cl.
*F16H 25/20* (2006.01)

(52) U.S. Cl.
CPC . *F16H 25/2056* (2013.01); *F16H 2025/2087* (2013.01)

(58) Field of Classification Search
CPC .................................................. F16H 25/2056
See application file for complete search history.

(56) References Cited

U.S. PATENT DOCUMENTS

| | | | |
|---|---|---|---|
| 4,651,581 A * | 3/1987 | Svensson | ............ F16H 25/2056 74/89.35 |
| 5,341,724 A | 8/1994 | Vatel | |
| 9,682,161 B2 | 6/2017 | Farren et al. | |
| 10,104,957 B2 | 10/2018 | Ergun et al. | |
| 10,500,122 B2 | 12/2019 | Aryananda et al. | |
| 10,960,178 B2 | 3/2021 | Savastano et al. | |
| 11,002,085 B2 | 5/2021 | Roodenburg et al. | |
| 11,077,901 B2 | 8/2021 | Pittens et al. | |
| 11,319,148 B2 | 5/2022 | Price et al. | |
| 2014/0290403 A1* | 10/2014 | Wu | ...................... F16H 25/2056 74/89.35 |
| 2019/0188471 A1 | 6/2019 | Osterhout et al. | |
| 2020/0157904 A1 | 5/2020 | Rodriguez | |
| 2021/0112970 A1* | 4/2021 | Polz | .................... F16H 25/2015 |
| 2021/0321760 A1* | 10/2021 | Windhaber | ............. A47B 9/04 |
| 2022/0153522 A1 | 5/2022 | Lin | |
| 2022/0211454 A1 | 7/2022 | Nikou et al. | |
| 2022/0348444 A1* | 11/2022 | Hu | ........................ E04H 12/182 |

FOREIGN PATENT DOCUMENTS

| | | |
|---|---|---|
| CN | 111064126 | 4/2020 |
| CN | 214342596 U | 10/2021 |

* cited by examiner

*Primary Examiner* — Randell J Krug
(74) *Attorney, Agent, or Firm* — DENTONS Durham Jones Pinegar

(57) ABSTRACT

The presently disclosed technology teaches a 3D-printed telescoping actuator. The 3D-printed telescoping actuator includes a ring gear, a carrier, one or more segments and drive screws. The segments and drive screws are made as consolidated single pieces. When the ring gear spins, the drive screws spins with the ring gear, and drive the segments to move in an axial direction and reach an extended state. The introduction of 3D printing could enable a plurality of parts in existing designs to be consolidated as a single piece, so fewer parts are needed in the presently disclosed actuator, which simplifies the design and manufacturing processes. Including fewer parts could also improve the durability of the actuator. Nevertheless, using consolidated parts also introduces brand-new assembly challenges. Therefore, additional features are introduced in the presently disclosed technology to facilitate the assembly process.

19 Claims, 11 Drawing Sheets

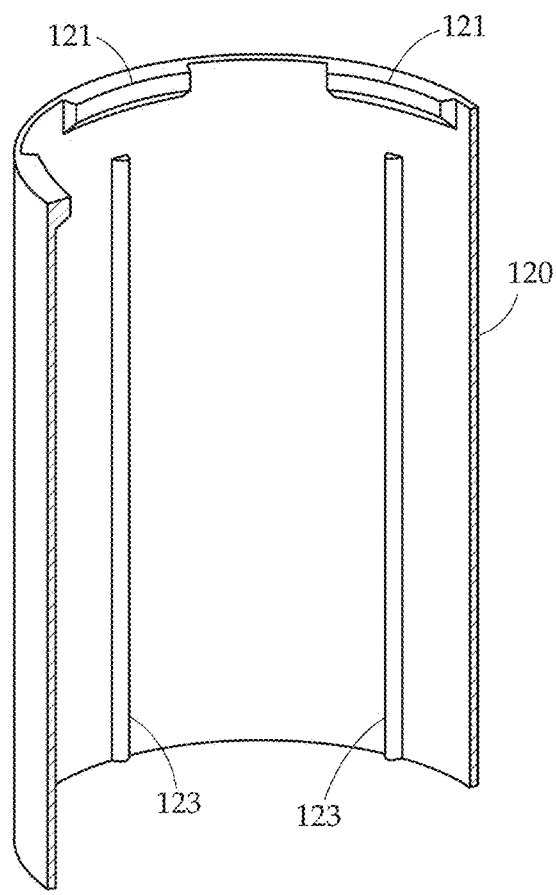
*Fig. 6A-a*
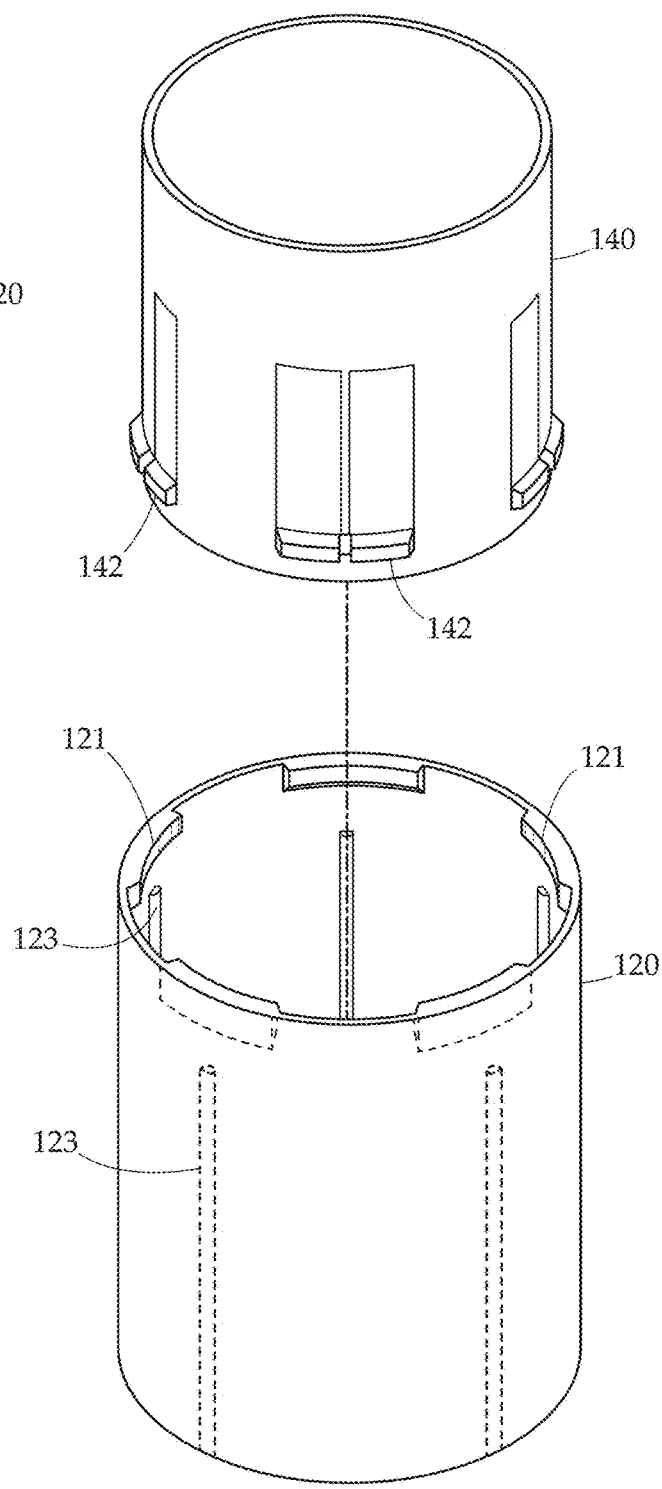
*Fig. 6A-b*

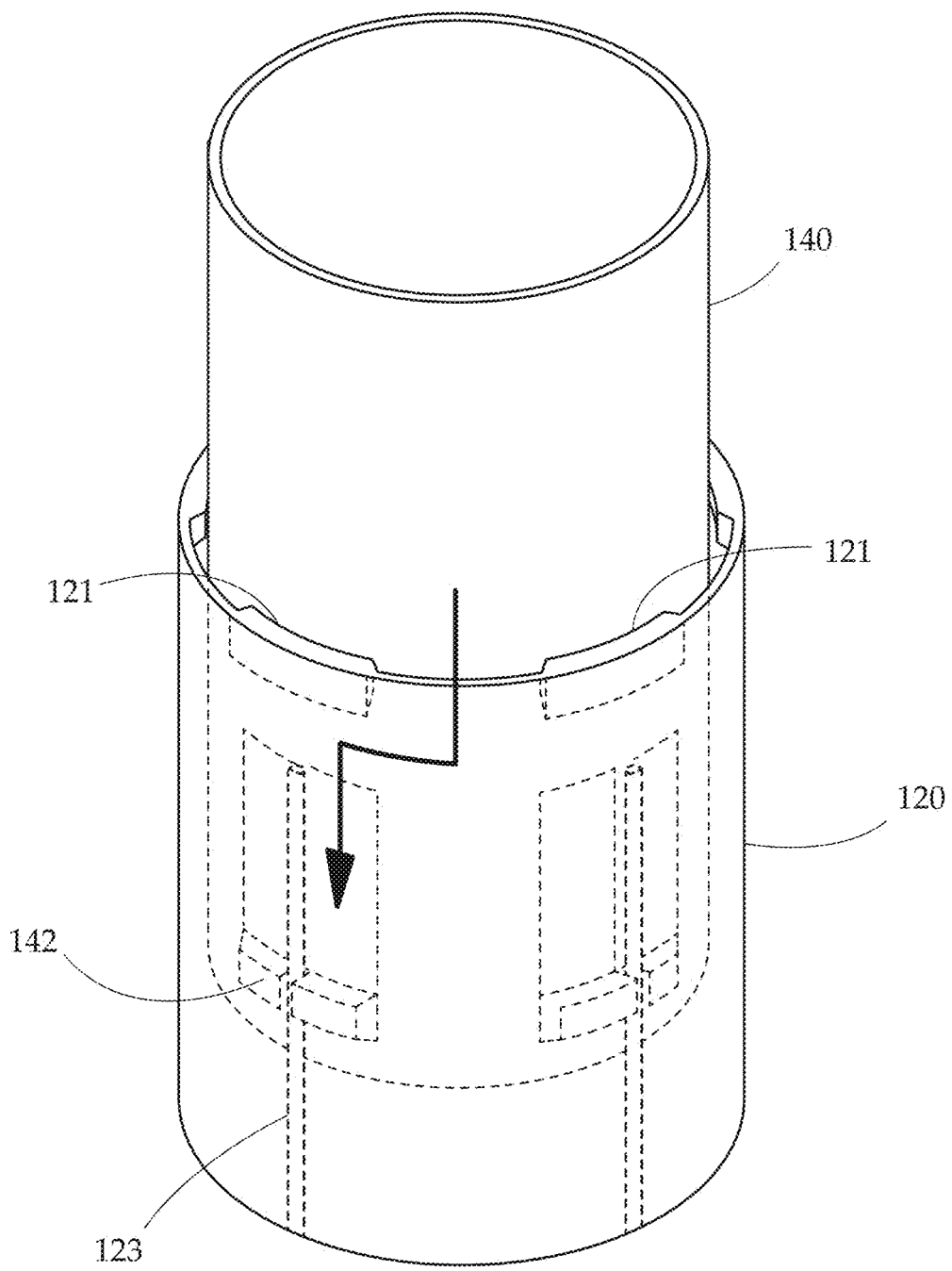
Fig. 6A-c

3D-PRINTED TELESCOPING ACTUATOR

TECHNICAL FIELD

The present disclosure relates to the field of actuators.

BACKGROUND

A telescoping actuator includes many components. With the introduction of 3D printing, components with more complex geometries can be made, and a plurality of parts in existing designs can be consolidated as a single piece. Therefore, the use of 3D printing in manufacturing could simplify the design of telescoping actuators and the assembly process. Additional features may be included to facilitate the assembly process of the consolidated pieces. Consolidating multiple pieces in existing designs into single pieces may also improve the endurance of the telescoping actuator since the structure is less likely to break from connecting points. 3D printing also enables manufacturers to customize the shapes of components and add more detailed features to the components, in order to optimize the performance of telescoping actuators.

SUMMARY

The present disclosure teaches a 3D-printed telescoping actuator, comprising: a ring gear; wherein, the ring gear is cylindrical; a carrier; wherein, the carrier is hollow and cylindrical; wherein, the carrier is placed co-axially with respect to the ring gear; wherein, the carrier is connected to the ring gear such that the carrier is able to spin with regard to the ring gear but unable to move in an axial direction with regard to the ring gear; a first drive screw placed inside the carrier; wherein, the first drive screw is cylindrical and placed co-axially with the carrier; wherein, the first drive screw is connected to the ring gear such that the first drive screw is able to spin along with the ring gear and with regard to the carrier but unable to move in the axial direction with regard to the ring gear nor the carrier; wherein, the first drive screw is connected to the ring gear via one or more gears, such that the first drive screw is able to spin with regard to the carrier in response to that the ring gear spins with regard to the carrier; a first segment; wherein, the first segment is cylindrical and placed co-axially with the carrier; wherein, the first segment is connected to the carrier via one or more first guiderails on the carrier interlocking with one or more first pairs of knubs on the first segment, such that the first segment is able to move in the axial direction with regard to the carrier but unable to spin with regard to the carrier; wherein, the first segment is connected to the first drive screw via a first pair of slopes or a first pair of one or more threads, such that the first segment is able to move in an axial direction with regard to the carrier in response to that the first drive screw spins with regard to the carrier; a second drive screw; wherein, the second drive screw is cylindrical and placed co-axially with the carrier; wherein, the second drive screw is connected to the first segment via a first recession and a matching first protrusion such that the second drive screw is able to spin but unable to move in the axial direction with regard to the first segment; a second segment; wherein, the second segment is cylindrical and placed co-axially with the carrier; wherein, the second segment is connected to the first segment via one or more second guiderails on the first segment interlocking with one or more second pairs of knubs on the second segment, such that the second segment is able to move in the axial direction but unable to spin with regard to the first segment; wherein, the second segment is connected to the second drive screw via a second pair of slopes or a second pair of one or more threads, such that the second segment is able to move in an axial direction with regard to the first segment in response to that the second drive screw spins with regard to the first segment; a third drive screw; wherein, the third drive screw is cylindrical and placed co-axially with the carrier; wherein, the third drive screw is connected to the second segment via a second recession and a matching second protrusion such that the third drive screw is able to spin but unable to move in the axial direction with regard to the second segment; a third segment; wherein, the third segment is cylindrical and placed co-axially with the carrier; wherein, the third segment is connected to the second segment via one or more third guiderails on the second segment interlocking with one or more third pairs of knubs on the third segment, such that the third segment is able to move in the axial direction but unable to spin with regard to the second segment; wherein, the third segment is connected to the third drive screw via a third pair of slopes or a third pair of one or more threads, such that the third segment is able to move in an axial direction with regard to the second segment in response to that the third drive screw spins with regard to the second segment; wherein, the first drive screw, the second drive screw, and the third drive screw are interlocked together so that they are able to move in an axial direction but unable to spin with regard to each other; wherein, the ring gear, the carrier, the first drive screw, the second drive screw, the third drive screw, the first segment, the second segment, and the third segment are 3D printed; wherein, the first drive screw, the second drive screw, the third drive screw, the first segment, the second segment, and the third segment are made as consolidated single pieces.

In some embodiments, the one or more first guiderails are linear protrusions parallel to the axial direction on an inner wall of the carrier, interlocking with the one or more first pairs of knubs on an outer wall of the first segment.

In some embodiments, the inner wall of the carrier includes one or more first overhangs corresponding to and above the one or more first guiderails, wherein the one or more first overhangs are protruding from the inner wall.

In some embodiments, there are first horizontal gaps between one or more overhangs, and the first horizontal gaps are larger than a width of each first pair of knubs.

In some embodiments, the one or more first pairs of knubs are able to slide through the first horizontal gaps during assembly.

In some embodiments, there are first vertical gaps between the one or more first overhangs and tops of the one or more first guiderails, and the first vertical gaps are larger than a height of each of the one or more first pairs of knubs.

In some embodiments, the one or more first pairs of knubs are able to slide through the first vertical gaps during assembly.

In some embodiments, there are no gaps between the one or more first overhangs and tops of the one or more first guiderails.

In some embodiments, the one or more first pairs of knubs are able to click over the one or more first guiderails during assembly.

In some embodiments, the one or more gears connect an inner wall of the ring gear and a connecting part of the first drive screw, wherein the inner wall includes a first plurality of teeth that interlocks with the one or more gears, wherein the connecting part includes a second plurality of teeth interlocking with the one or more gears.

In some embodiments, the carrier includes a grip and an inner carrier; wherein the grip is hollow and cylindrically shaped, with a textured outer surface; wherein the inner carrier is cylindrically shaped and placed inside the grip; wherein the inner carrier is statically connected to the grip with friction.

In some embodiments, the inner carrier includes a bottom with one or more air holes.

In some embodiments, the first segment includes a first screw connector, wherein the first screw connector is hollow and cylindrically shaped; wherein a bottom circumference of the first screw connector levels with a bottom circumference of the first segment; wherein an inner wall of the first screw connector includes one slope in the first pair of slopes.

In some embodiments, an outer wall of the first drive screw includes another slope in the first pair of slopes, wherein the first pair of slopes fit together.

In some embodiments, the first screw connector is placed co-axially with the first segment and connected to the first segment via a first bottom.

In some embodiments, the first bottom includes one or more air holes.

In some embodiments, the first drive screw, the second drive screw, and the third drive screw are interlocked together by a plurality of protrusions and recessions on surfaces of the first drive screw, the second drive screw, and the third drive screw.

In some embodiments, the first protrusion is placed on an outer wall of the first screw connector, and the first recession is placed on an inner wall of the second screw, wherein the first protrusion and the first recession are able to clip together.

In some embodiments, the protrusion is shaped as a stripe parallel to a bottom circumference of the first screw connector.

BRIEF DESCRIPTION OF THE DRAWINGS

The present disclosure is further illustrated by way of exemplary embodiments, which are described in detail through the accompanying drawings. These embodiments are not limiting, and in these embodiments, the same numbering indicates the same structure, wherein:

FIGS. 6A-a, 6A-b, and 6A-c are a structural diagrams showing how the carrier and the first segment are assembled, according to some embodiments of the presently disclosed technology.

FIG. 6B is a structural diagram showing how the first segment and the second segment are assembled, according to some embodiments of the presently disclosed technology.

DETAILED DESCRIPTION

Figure 1A:
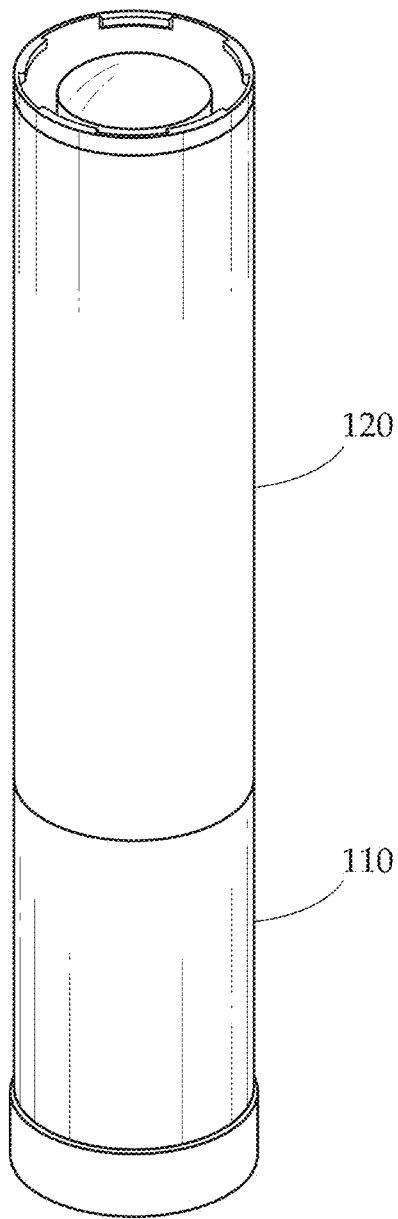
FIG. 1A is an isometric view diagram showing the structure of the 3D printed telescoping actuator, when retracted, according to some embodiments of the presently disclosed technology.

In order to more clearly illustrate the technical solutions of the embodiments of the present disclosure, the accompanying drawings for the description of the embodiments are described below. Obviously, the accompanying drawings in the following description are only some examples or embodiments of the present disclosure, and it is possible for a person of ordinary skill in the art to apply the present disclosure to other similar scenarios in accordance with these accompanying drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, if other words may achieve the same purpose, the terms may be replaced with alternative expressions.

As indicated in the present disclosure and in the claims, unless the context clearly suggests an exception, the words "one," "a," "a kind of," and/or "the" do not refer specifically to the singular but may also include the plural. In general, the terms "include" and "comprise" suggest only the inclusion of clearly identified steps and elements, which do not constitute an exclusive list, and the method or device may also include other steps or elements.

Figure 1B:
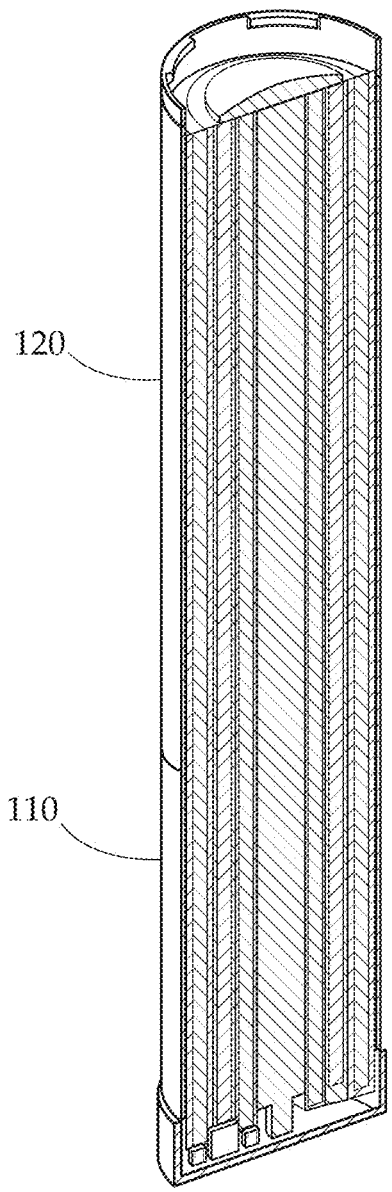
FIG. 1B is a lateral cross-section view diagram showing the structure of the 3D printed telescoping actuator, when retracted, according to some embodiments of the presently disclosed technology.
Figure 1C:
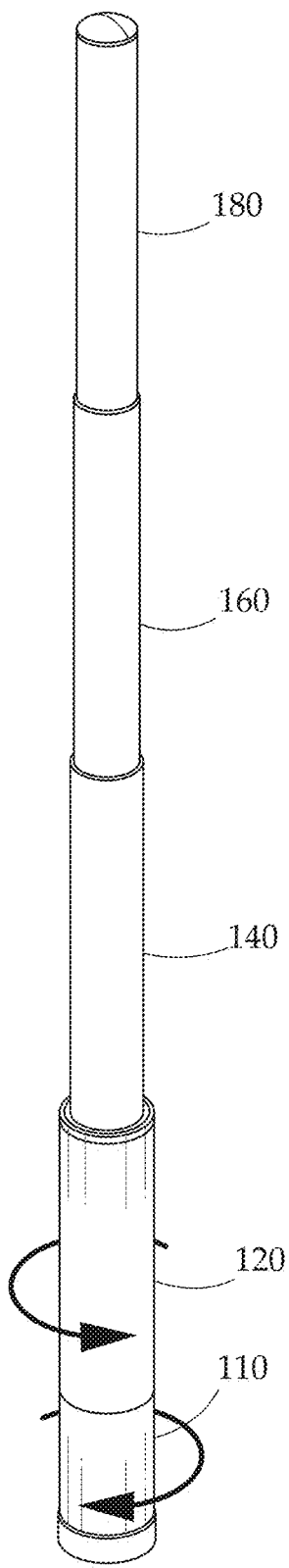
FIG. 1C is an isometric view diagram showing the structure of the 3D printed telescoping actuator, when extended, according to some embodiments of the presently disclosed technology.
Figure 1D:
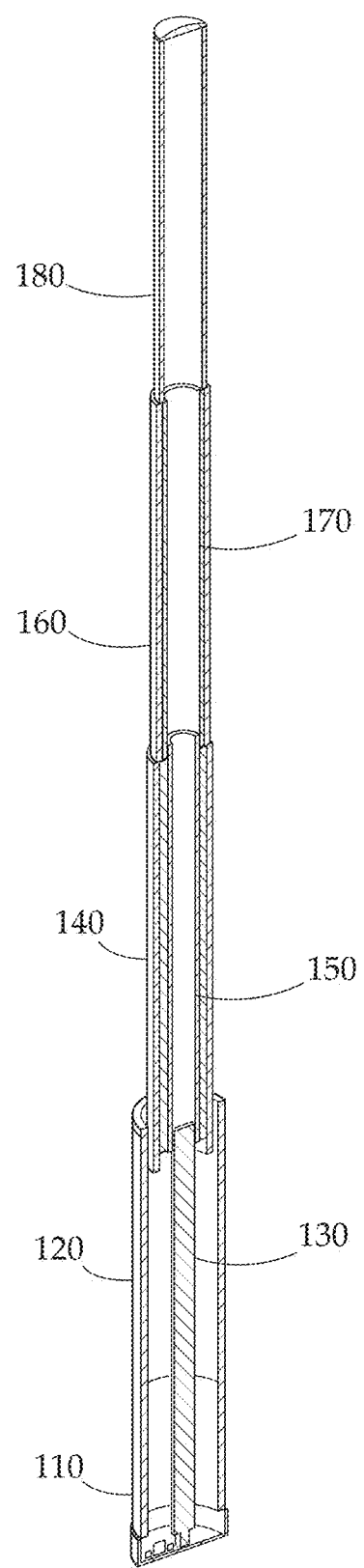
FIG. 1D is a lateral cross-section view diagram showing the structure of the 3D printed telescoping actuator, when extended, according to some embodiments of the presently disclosed technology.

FIGS. 1A-D illustrate the structure of the 3D printed telescoping actuator, according to some embodiments of the present disclosure. Wherein, FIG. 1A is an isometric view diagram showing the structure of the 3D printed telescoping actuator, when retracted, according to some embodiments of the presently disclosed technology; FIG. 1B is a lateral cross-section view diagram showing the structure of the 3D printed telescoping actuator, when retracted, according to some embodiments of the presently disclosed technology; FIG. 1C is an isometric view diagram showing the structure of the 3D printed telescoping actuator, when extended, according to some embodiments of the presently disclosed technology; and FIG. 1D is a lateral cross-section view diagram showing the structure of the 3D printed telescoping actuator, when extended, according to some embodiments of the presently disclosed technology.

As illustrated in FIGS. 1A and 1, when retracted, the telescoping actuator may have a cylindrical shape. In some other embodiments, the telescoping actuators may have other shapes. The bottom section of the telescoping actuator, as in FIGS. 1A and 1B, may be a cylindrically shaped ring gear 110. The ring gear may be connected to a carrier 120. The carrier 120 may also be cylindrically shaped. In some embodiments, the carrier 120 may be elongated along the axial direction. In some embodiments, the carrier 120 may be hollow, and may house other components of the telescoping actuator when the telescoping actuator is retracted, which will be discussed in detail in the later sections. In some embodiments, the carrier 120 may be placed co-axially and adjacent to the ring gear 110. In some embodiments, the carrier 120 may be able to spin freely with regard to the ring gear 110. In some embodiments, the carrier 120 may not be able to move along the axial direction with regard to the ring gear 110. In some embodiments, a diameter of the carrier 120 may equal a diameter of the ring gear 110. In some embodiments, the ring gear 110 and/or the carrier 120 may have a textured side surface to increase friction when a user spins the ring gear with regard to the carrier.

In some embodiments, the telescoping actuator may include a plurality of segments and drive screws. In some embodiments, the number of segments equals the number of drive screws. In the exemplary embodiment as illustrated by FIGS. 1C and 1D, the telescoping actuator includes three segments and three drive screws. In some embodiments, the segments and drive screws may be shaped as hollow cylinders. In some embodiments, the segments and drive screws may be elongated. In some embodiments, all the segments and drive screws may be placed co-axially with the carrier. In some embodiments, the diameters of all the segments and drive screws may be smaller than the carrier 110, so that they can be housed in the carrier. In some embodiments, the segments and drive screws may have different diameters, so along with the carrier, they can be placed inside one another like a set of Russian nesting dolls when the telescoping actuator is retracted, which will be further discussed in the later sections. As illustrated in FIG. 1D, the segments are placed in the outer layers and the drive screws are placed in the inner layers. The adjacent layers are connected to each other. In some embodiments, the innermost drive screw may not be hollow. In some embodiments, lengths of all the segments and drive screws may the same as, or slightly smaller than, a length of the carrier 120. In some embodiments, when the telescoping actuator is retracted, the segments may be fully housed or substantially housed in the carrier 120 from the side and cannot be seen from a side view.

When a user rotates the ring gear 110 with regard to the carrier 120, the ring gear 110 may drive the drive screws, which in turn extend or retract the segments accordingly. When the ring gear 110 rotates in one direction, the telescoping actuator may extend. When the ring gear 110 rotates in the opposite direction, the telescoping actuator may retract. When the telescoping actuator reaches its fully extended or retracted state, the ring gear 110 may be locked with regard to the carrier 120, and unable to continue rotating.

As illustrated in FIGS. 1C and 1D, when fully extended, the telescoping actuator may have an elongated tubular shape. One end of the telescoping actuator may be thinner than the other end. In the exemplary embodiment as in FIGS. 1C and 1D, the telescoping actuator comprises three segments, and each segment has a length that roughly equals the length of the carrier. When the telescoping actuator is fully extended, a first segment 140 may be on top of the carrier 120 and partially enclosed by the carrier; a second segment 160 may be on top of the first segment 140 and partially enclosed by the first segment; a third segment 180 may be on top of the second segment 160 and partially enclosed by the second segment. The enclosed parts may be significantly smaller than the total lengths of the segments. The top end of the third segment 180 may be closed. A diameter of the first segment 140 may be slightly smaller than the diameter of the carrier 120, so that the first segment can be fully housed or substantially housed in the hollow structure of the carrier when the telescoping actuator is retracted. Likewise, a diameter of the second segment 160 may be slightly smaller than the diameter of the first segment 140, so that the second segment can be fully housed or substantially housed in the hollow structure of the first segment when the telescoping actuator is retracted. Likewise, a diameter of the third segment 180 may be slightly smaller than the diameter of the second segment 160, so that the third segment can be fully housed or substantially housed in the hollow structure of the second segment when the telescoping actuator is retracted. In some embodiments, the segments can move with respect to the carrier and each other in the axial direction but cannot spin with regard to the carrier and each other. This feature will be further discussed in the later paragraphs.

The ring gear 110 connects to the innermost drive screw in the "nesting doll" set of drive screws. When the ring gear 110 rotates, the set of drive screws rotates accordingly. The innermost drive cannot move in the axial direction with regard to the ring gear 110 and the carrier 120, but it can spin with respect to the carrier 120. It may or may not spin at the same angular speed as the ring gear 110. The drive screws may connect to each other so that they can move along the axial direction with respect to each other, but they cannot spin with respect to each other.

In the exemplary embodiment shown in FIG. 1D, there are three drive screws. A first drive screw 130 is placed at the innermost/bottommost position and has the smallest diameter among the drive screws. The first drive screw 130 connects to the ring gear 110. A length of the first drive screw 130 roughly equals the length of the carrier 120. When the ring gear 110 rotates with regard to the carrier, the first drive screw 130 also rotates with regard to the carrier, along with the ring gear. In some embodiments, the first drive screw 130 may rotate in the opposite direction from the ring gear 110 and at a higher angular speed. The connection between the first drive screw 130 and the ring gear 110 will be further discussed in FIGS. 5A-C and the accompanying descriptions.

The first drive screw 130 is connected with the first segment 140 and the second drive screw 150 in such a way that, when the first drive screw rotates, it moves the first segment and the second drive screw in the axial direction with regard to the first drive screw. The first segment and the second drive screw are connected in such a way that they cannot move in the axial direction with regard to each other. The second drive screw 140 is connected to the first drive screw 130 in such a way that the second drive screw cannot spin with regard to the first drive screw. When the telescoping actuator is fully extended, as illustrated in FIG. 1D, the second drive screw 150 is on top of the first drive screw 130, and partially enclosing the first drive screw. A diameter of the second drive screw 150 may be slightly larger than the diameter of the first drive screw 130, so that the first drive screw can be housed in the hollow structure of the second drive screw 150 when the telescoping actuator is fully retracted.

The second screw 150 is connected with the second segment 160 and the third drive screw 170 in such a way that, when the second drive screw rotates, it moves the second segment and the third drive screw in the axial direction with regard to the second drive screw. The second segment and the third drive screw are connected in such a way that they cannot move in the axial direction with regard to each other. When the telescoping actuator is fully extended, as illustrated in FIG. 1D, the third drive screw 170 is on top of the second drive screw 150, and partially enclosing the second drive screw. A diameter of the third drive screw 170 may be slightly larger than the diameter of the second drive screw 150, so that the second drive screw can be housed in the hollow structure of the third drive screw 150 when the telescoping actuator is fully retracted.

The third drive screw 170 is connected with the third segment 180 in such a way that, when the second drive screw rotates, it moves the third segment in the axial direction with regard to the third drive screw. When the telescoping actuator is fully extended, as illustrated in FIG. 1D, the third segment 180 is on top of the third drive screw 170, and partially enclosing the third drive screw. A diameter of the third drive screw 170 may be slightly larger than the diameter of the second drive screw 150, so that the second drive screw can be housed in the hollow structure of the third drive screw 150 when the telescoping actuator is fully retracted.

In some embodiments, the ring gear 110, the carrier 120, the segments, and the drive screws are all 3D printed. The use of 3D printing may enable the carrier 120, the segments, and the drive screws to be made as consolidated single pieces. As discussed in the background section, this improvement could simplify the manufacturing and assembly processes, and enhance the endurance of the telescoping actuator.

Figure 2:
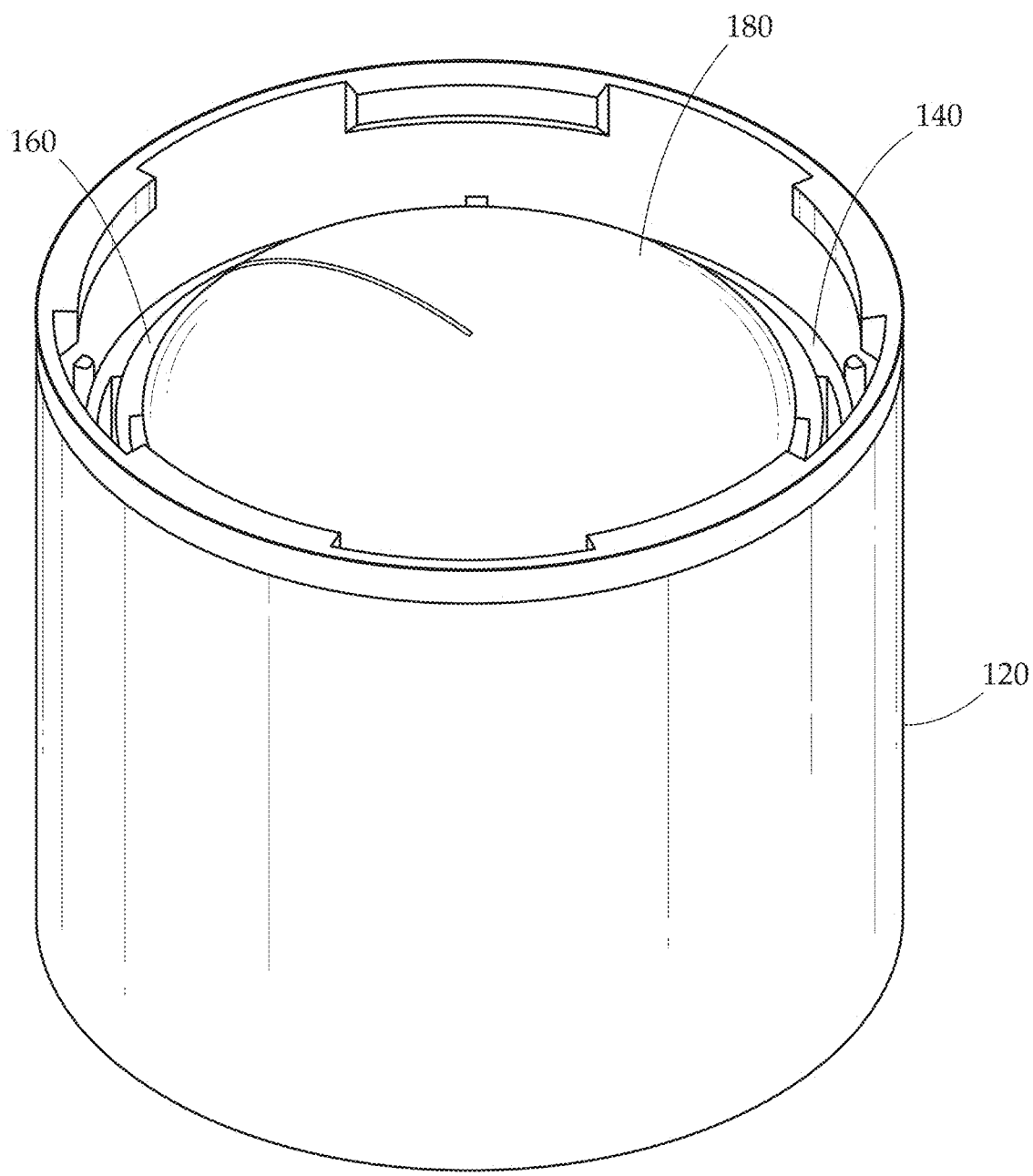
FIG. 2 is a perspective top view, illustrating the structure of the 3D printed telescoping actuator, when retracted, according to some embodiments of the presently disclosed technology.

FIG. 2 is a perspective top view, illustrating the structure of the 3D printed telescoping actuator, when retracted, according to some embodiments of the presently disclosed technology. As discussed above, in some embodiments, the lengths of the segments may be roughly the same or slightly shorter than the length of the carrier 120, so that the segments can be housed in the carrier when the telescoping actuator is retracted. The segments may be co-axially placed with regard to the carrier 120, and along with the carrier, they may be placed inside each other like a set of Russian nesting dolls. Wherein, the carrier 120 may have the largest diameter and is placed at the outmost position; the first segment 140 may have the second largest diameter and is placed at the second outmost position, housed inside the carrier; the second segment 160 may have the third largest diameter and is placed at the third outmost position, housed inside the first segment; the third segment 180 may have the smallest diameter among the segments, and housed inside the second segment.

In the exemplary embodiment as illustrated by FIG. 2, inside the carrier 120, the outmost segment is the first segment 140. It has a cylindrical shape with an open top, with a diameter slightly smaller than the diameter of the carrier 120. Inside the first segment 140 is the second segment 160. It also has a cylindrical shape with an open top, with a diameter slightly smaller than the diameter of the first segment 140. Inside the second segment 160 is the third segment 180. It has a cylindrical shape with a closed top, with a diameter slightly smaller than the diameter of the second segment 160. The drive screws are housed inside the third segment 180 and cannot be seen from the top view.

Figure 3:
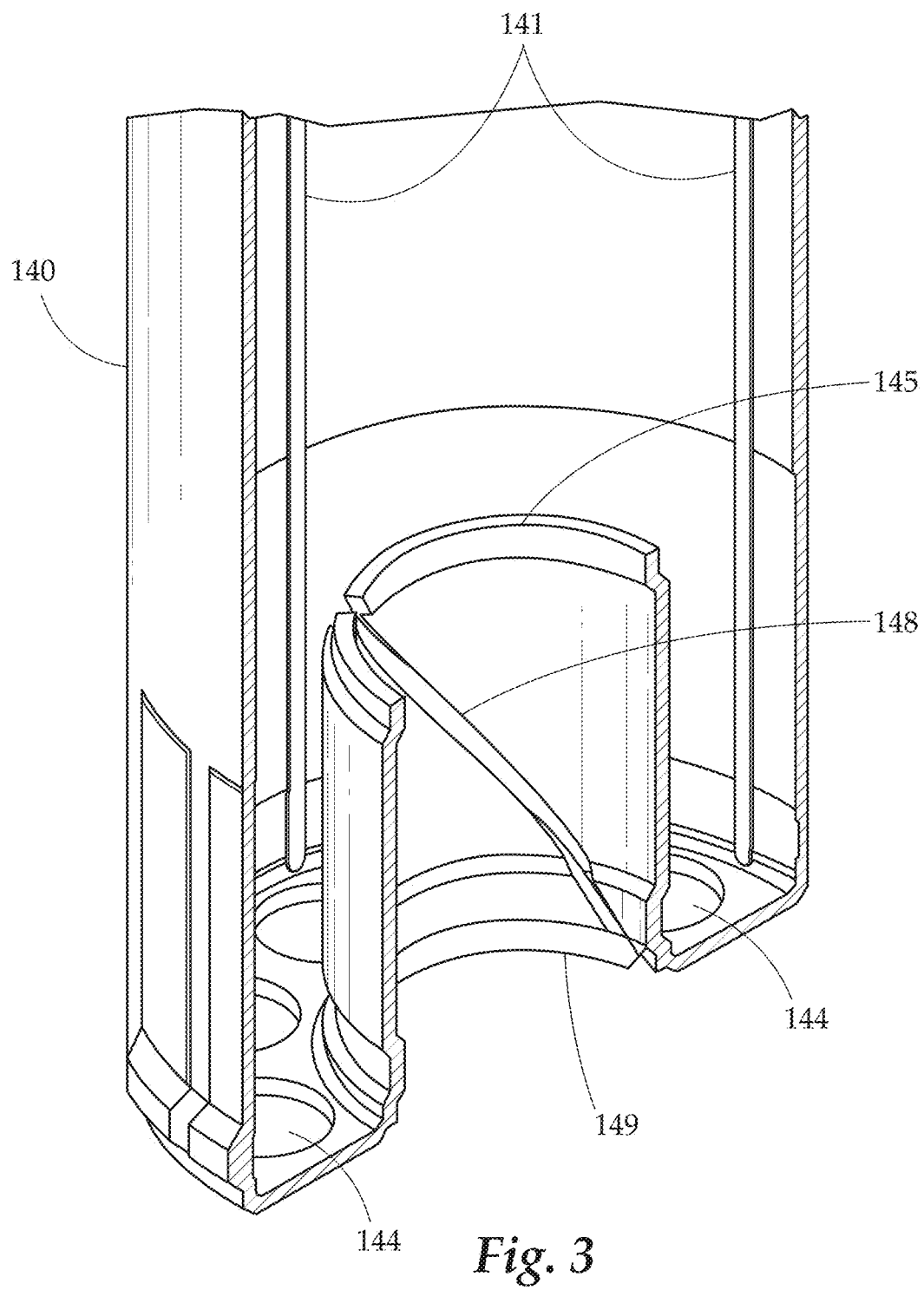
FIG. 3 is a lateral cross-section diagram of the first segment, illustrating the detailed structure of each segment, according to some embodiments of the presently disclosed technology.

FIG. 3 is a lateral cross-section diagram of the first segment 140, illustrating the detailed structure of each segment, according to some embodiments of the presently disclosed technology.

As discussed above, in some embodiments, the first segment 140 may be 3D printed and made as a consolidated single piece. As discussed above, the first segment 140 may have a hollow, elongated cylindrical shape with an open top—in other words, a tubular shape. In some embodiments, the first segment 140 may also include a first screw connector 145. The first screw connector 145 may have a much shorter tubular shape and may be placed inside the first segment 140, and co-axial with the first segment. A bottom of the first screw connector 145 may level with a bottom of the first segment 140, and the two bottoms may connect via a first circular bottom connector 149. The screw connector 145 and the first circular bottom connector 149 may be consolidated with the first segment 140 as a single piece.

In some embodiments, the first circular bottom connector 149 may include one or more air holes 144. The air holes 144 may be circular or may be of other shapes. The air holes 144 may be symmetrically placed and may form a circle around the first screw connector 145. The air holes 144 may reduce the air friction in the telescoping actuator, thus improving the actuator's performance.

In some embodiments, the second segment 160 may likewise have a second circular bottom connector, and the second circular bottom connector may also include air holes.

In some embodiments, the first segment 140 may include guiderails 141 on an inner wall of its elongated cylindrical shape. The guiderails 141 may be one or more protrusions shaped as vertical lines. In the exemplary embodiment as shown in FIG. 3, there are four guiderails, placed evenly on the inner wall of the first segment 140. The guiderails 141 may ensure that the second segment 160 may only move in the axial direction with regard to the first segment 140 and cannot spin with regard to the first segment. In some embodiments, the second segment 160 and the carrier 120 may likewise have guiderails on their inner walls.

In some embodiments, the number of guiderails may be different. In some embodiments, the guiderails may not be placed evenly. In some embodiments, the guiderails may be recessions instead of protrusions. In some embodiments, each guiderail may contain a pair or a plurality of vertical lines, instead of a single line. In some embodiments, the guiderails may be placed on an outer wall of the first segment 140 instead.

In some embodiments, the first segment 140 may include knubs 142 located near or adjacent to the bottom on an outer wall of its elongated cylindrical shape. The knubs 142 may be protrusions evenly placed in pairs along a circumference of the bottom of the first segment 140. The knubs 142 may have gaps in between them. In one exemplary embodiment, the first segment 140 may have four evenly placed pairs of knubs. Between each knubs in a pair, the width of the gap may be roughly the same or slightly larger than the width of the guiderails on an inner wall of the carrier 120. Therefore, the knubs 142 may interlock with the guiderails on the carrier 120, so that the first segment 140 cannot spin with regard to the carrier 120.

In some embodiments, the shapes of the knubs or the number of the numbers may be different. In some embodiments, the knubs may not be grouped as pairs. In some embodiments, the knubs may not be evenly placed along the circumference of the bottom of the first segment 140. In some embodiments, the second segment 160 and the third segment 180 may also likewise include knubs. In some embodiments, the knubs may be placed on an inner wall of the carrier 120 instead.

In some embodiments, a diameter of the first screw connector 145 may be slightly larger than the diameter of the first drive screw 130. The first screw connector 145 may be placed outside of the first drive screw 130 and adjacent to the first drive screw. In the exemplary embodiment as shown in FIG. 3, an inner wall of the first screw connector 145 may include a slope 148. Alternatively, the slope 148 may also be one or more threads forming a screw. An outer wall of the first drive screw may also have a slope corresponding to the slope 148 (or one or more threads interlocking with the threads on the first screw connector 145). Via the slopes/threads, the rotation of the first drive screw 130 may translate to the linear movement of the first segment 140 with regard to the carrier 120.

Likewise, in some embodiments, the second segment 160 may include a second screw connector similarly structured. In some embodiments, the third segment 180 may either include a third screw connector similarly structured or have a slope/one or more threads like the slope 148 on its inner wall, so that the rotational movement of the third drive screw 170 may likewise translate to the linear movement of the third segment.

Figure 4:
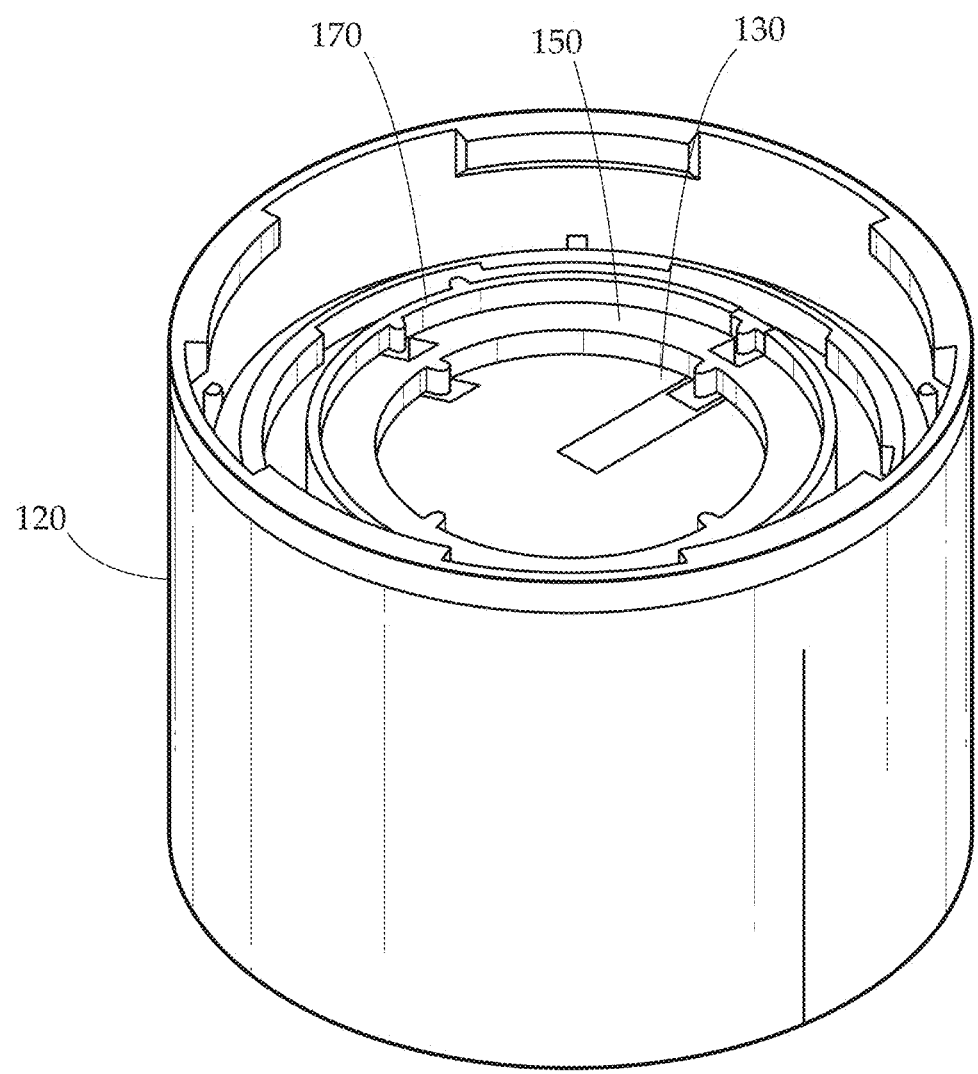
FIG. 4 is an axial cross-section view diagram of the 3D printed telescoping actuator, showing the interlocking structure of the screws, according to some embodiments of the technology.

FIG. 4 is an axial cross-section view diagram of the 3D printed telescoping actuator, showing the interlocking structure of the screws, according to some embodiments of the technology.

As discussed above, the drive screws may be arranged in away that they are able to move in the axial direction but are not able to spin with regard to one another. This way, the other drive screws can be driven in the upward direction with the bottommost drive screw's rotational movement, and can spin with such movement.

To achieve this goal, in some embodiments of the presently disclosed technology, the drive screws may include an interlocking structure. FIG. 4 shows one exemplary way of implementing such a structure.

As illustrated in FIG. 4, four evenly placed protrusions are placed respectively on the outer walls of the first drive screw 130 and the second drive screw 150. Corresponding to the protrusions, four evenly placed recessions are placed respectively on the inner walls of the second drive screw 150 and the third drive screw 170. The protrusions interlock with the recessions. This interlocking structure allows the first drive screw 130, the second drive screw 150, and the third drive screw 170 to spin together, but also able to slide in the axial direction when the telescoping actuator extends.

The interlocking structure may also be implemented in other ways rendered obvious by a person with an ordinary level of skills in the art. For example, the number of protrusions/recessions on each drive screw may differ. For another example, the protrusions/recessions may not be placed evenly or symmetrically. For another example, the protrusions may be placed on the inner walls, and the recessions may be placed on the outer walls. For another example, guiderails, as discussed in the previous paragraphs, may be implemented on the drive screws to achieve the same purpose.

Figure 5A:
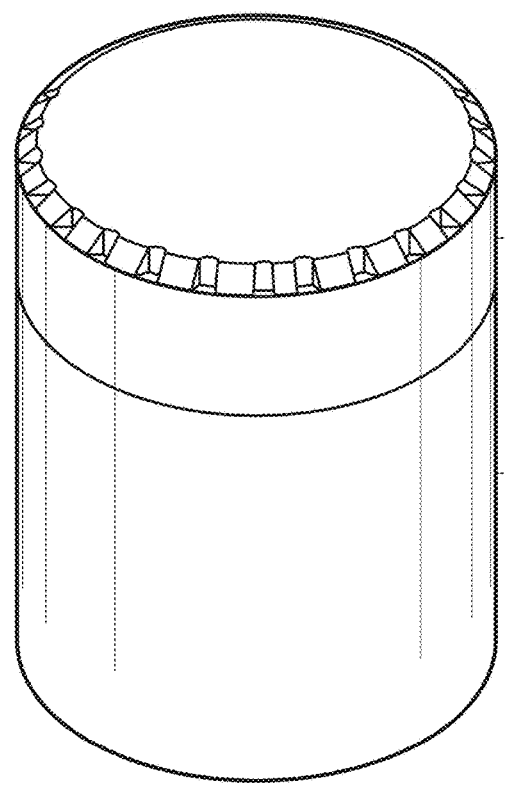
FIG. 5A-C are perspective bottom view diagrams showing the detailed structure of the ring gear, the grip, and the carrier.
Figure 5B:
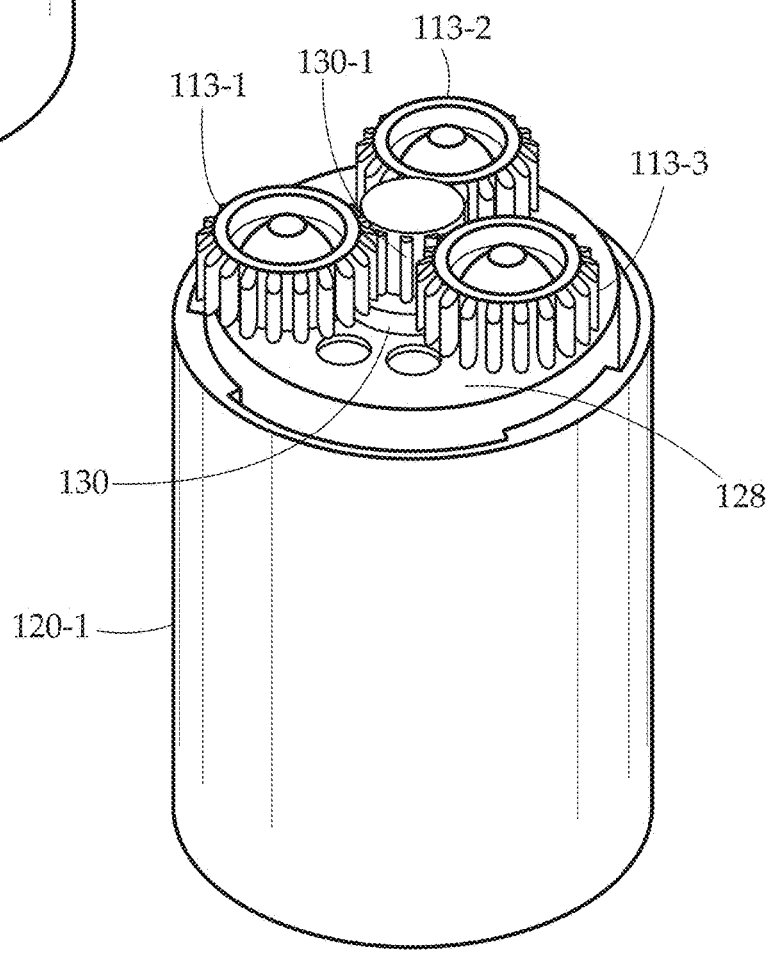
Figure 5C:
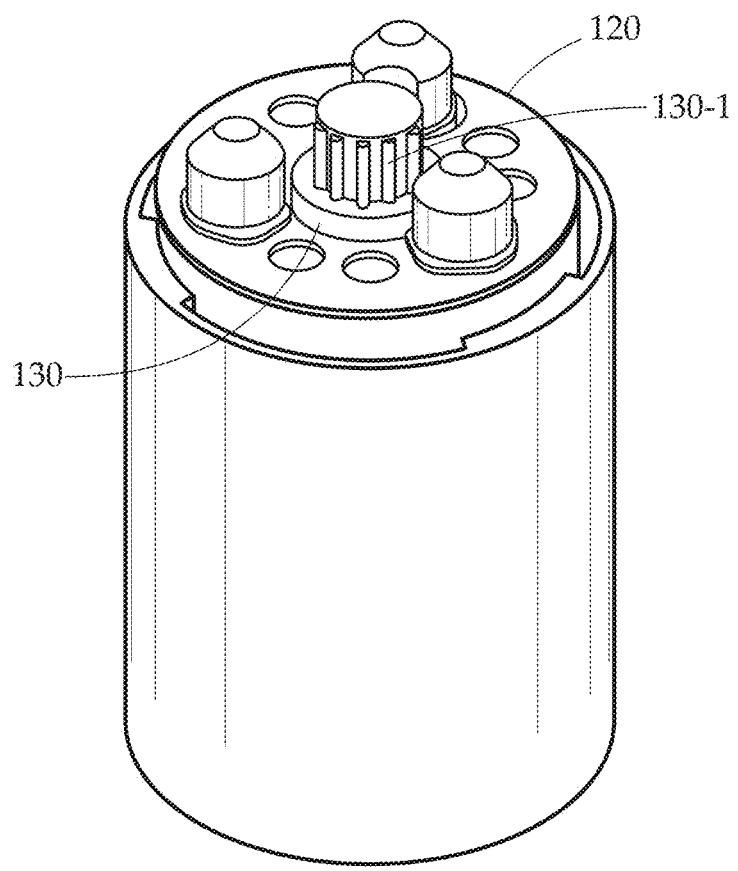

FIG. 5A-C are perspective bottom view diagrams showing the detailed structure of the ring gear, and how the ring gear connects with the carrier and the bottommost screw in the telescoping actuator.

As illustrated in FIG. 5A, in some embodiments, the ring gear 110 may be the bottom most part of the telescoping actuator and may be of a short cylindrical shape. The ring gear 110 may be hollow with a closed bottom surface. The ring gear 110 may be placed co-axially with and adjacently to the grip 120-1. The grip 120-1 may be of a hollow cylindrical shape. The grip 120-1 may be elongated comparing to the ring gear 110. The grip 120-1 and the ring gear 110 may have equal diameters. The grip 120-1 and the ring gear 110 may be able to spin freely with respect to each other. The outer wall of the grip 120-1 may be textured to increase friction when a user spins the grip. The outer wall of the ring gear 110 may also be textured.

As illustrated in FIG. 5B, an inner wall of the ring gear 110 may include gear teeth, which may interlock with and drive three gears 113-1, 113-2, and 113-3. In some embodiments, the three gears 113-1, 113-2, and 113-3 may be of the same circular shape and size, and they may be placed evenly surrounding the central axis of the actuator, on the bottom of the carrier 120. In other embodiments, the gears may not be perfectly identical and may not be perfectly placed evenly around the central axis of the actuator. In other embodiments, the number of gears may be different. The grip 120-1 may rotate along with the ring gear 110, with respect to the static carrier 120. Wherein, frictions between the grip 120-1 and the carrier 120 may act as a break, which stops the carrier from spinning or moving in the axial direction with respect to the grip, as well as the ring gear. A hole may be located at the center of the bottom of the carrier 120. A connecting gear 130-1 of the first drive screw 130 may stick out of the hole and interlocks with the three gears 113-1, 113-2, and 113-3. The ring gear 110 may drive the first drive screw 130 via the three gears 113-1, 113-2, and 113-3, as well as the connecting gear 130-1.

The ring gear 110 may also drive the bottommost drive screw by other means deemed obvious in the eyes of a person with ordinary skills in the art. For example, the connecting gear 130-1 may integrate with the ring gear as a consolidated piece. For another example, two gears, instead of three gears, may be used to connect the connecting gear 130-1 and the ring gear 110.

In the exemplary embodiment as illustrated in FIGS. 5B and 5C, the bottom of the carrier 120 has three protrusions evenly placed around the connecting gear 130-1. Alternatively, in some other embodiments, depending on the number, shapes, and sizes of the gears, the number of the protrusions may be different, or not perfectly evenly placed around the connecting gear 130-1. The protrusions are cylindrically shaped and function as gear shafts for the three gears 113-1, 113-2, and 113-3. Wherein, friction between the gear shafts and the three gears 113-1, 113-2, 113-3 may also ensure that the carrier 120 could not move in the axial direction with regard to the ring gear 110.

In the exemplary embodiment as illustrated in FIGS. 5B and 5C, the bottom of the carrier 120 also has air holes placed between the three gears 113-1, 113-2, and 113-3. The air holes may overlap with the air holes 144 on the bottom of the first segment 140, so that air friction may be reduced when the telescoping actuator extends or retracts.

Figure 6B:
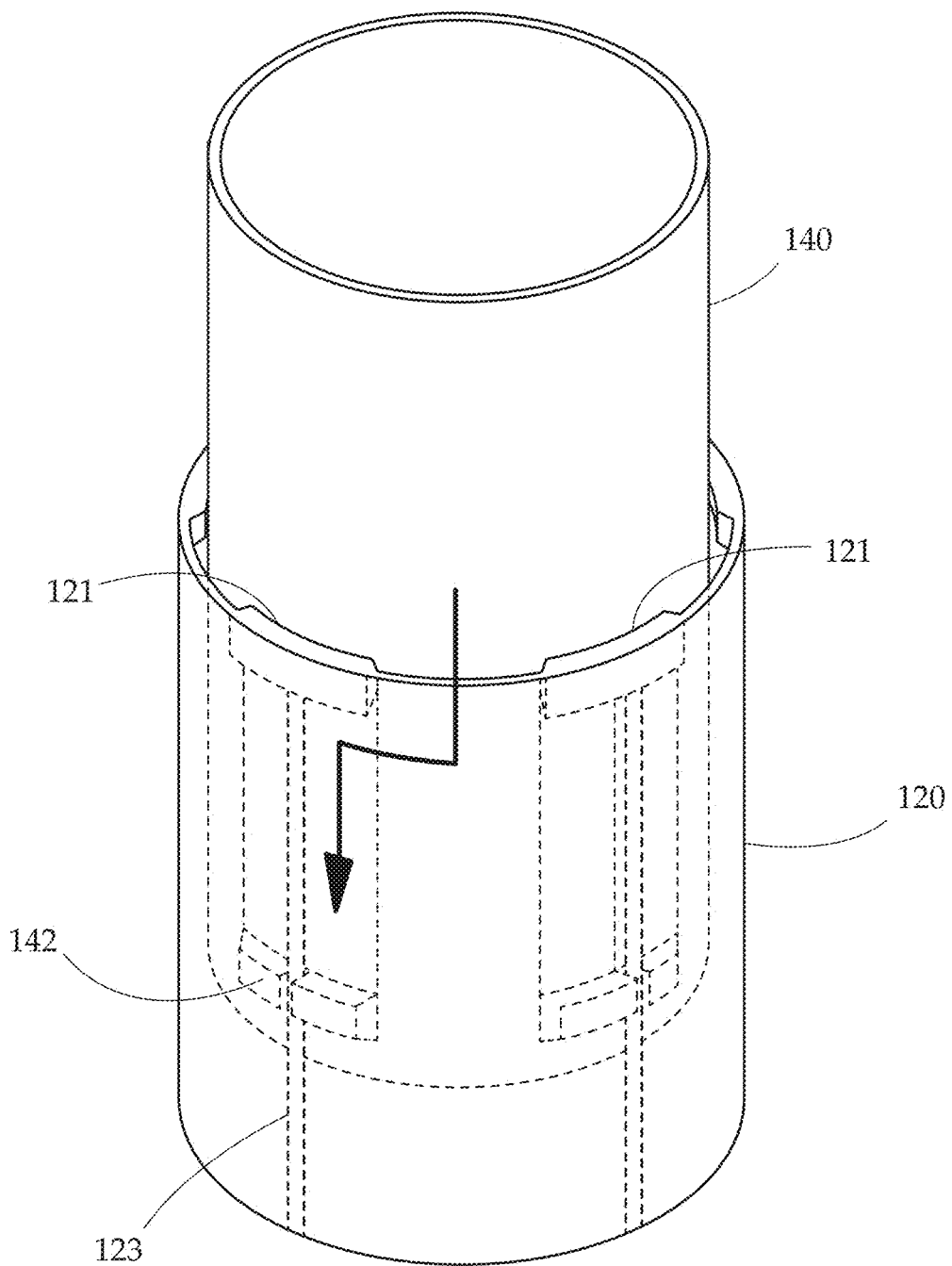

Using 3D-printed, consolidated parts also brings assembly challenges. Therefore, some embodiments of the presently disclosed technology may include special features to facilitate the assembly process. FIGS. 6A-a, 6A-b, 6A-c and 6B illustrate such features in detail, according to some embodiments of the presently disclosed technology.

FIGS. 6A-a, 6A-b and 6A-c are structural diagrams showing how the carrier and the first segment are assembled, according to some embodiments of the presently disclosed technology.

As shown in FIG. 6A-a, a set of overhangs 121 may be placed at the top of the inner wall of the carrier 120. In some embodiments, the overhangs 121 may be elongated protrusions. In some embodiments, the overhangs 121 may be rectangular. In some embodiments, the overhangs 121 may be adjacent to the top of the inner wall. In some embodiments, the center of each overhang 121 may be placed right above each guiderail 123. In some embodiments, there may be four guiderails 123 and four overhangs 121 corresponding to each overhang. In other embodiments, the number of guiderails 123 and overhangs 121 may differ. In some embodiments, the guiderails 123 and overhangs 121 may be evenly placed around a circumference of an axial cross-section of the carrier 120. In some embodiments, there may be a gap between the overhang 121 and a top of the guiderail 123. In some embodiments, there may be gaps between the overhangs 121.

As shown in FIG. 6A-b, a plurality of pairs of knubs 142 may be placed near the bottom of the outer wall of the first segment 140. In some embodiments, the knubs 142 may be protrusions with rectangular shapes, with their width larger than their height. In some embodiments, there may be larger gaps between the pairs of knubs, and smaller gaps between the two knubs within a pair. In some embodiments, there may be four pairs of knubs 142, corresponding to the four overhangs 121 on the carrier 120, and the four guiderails 123.

During assembly, the movement of the first segment 140 with respect to the carrier 120 follows the broken line in FIG. 6A-c. In some embodiments, the gaps between the overhangs 121 may be larger than the width of a pair of knubs 142, so that the pairs of knubs may fit into the gaps between the overhangs during assembly. In some embodiments, the gaps between an overhang 121 and the guiderail 123 may be larger than the height of the knubs 142, so that the knubs 142 can fit into the gap when an assembler spins the first segment 140 with respect to the carrier 120. In some embodiments, the gaps between the two knubs 142 in a pair may be slightly larger than the width of the guiderails 123, so that the guiderails may fit into the gap between the two knubs in a pair. Therefore, as discussed above, the interlocking structure formed by the knubs 142, and the guiderails 123 may ensure that the first segment 140 may move in the axial direction with regard to the carrier 120 but cannot spin with regard to the carrier.

Note that a person with ordinary skills in the art may modify this process. For example, the number of knubs, guiderails, and overhangs may be different. For example, the shapes of the knubs and overhangs may be different. For example, the guiderails may not be evenly placed along a circumference of an axial cross-section of the carrier. For example, there may be no gap between an overhang and the corresponding guiderail, and when an assembler spins the first segment with respect to the carrier, the knubs may click over the guiderail.

FIG. 6B is a structural diagram showing how the first segment and the second segment are assembled, according to some embodiments of the presently disclosed technology. This process is largely similar to how the first segment and the carrier are assembled, but with a minor difference.

Like the carrier 120, an inner wall of the first segment 140 may also include guiderails 141 and overhangs 143. The difference is, there is no gap between the guiderails 141 and the overhangs 143. In some embodiments, a set of overhangs 143 may be placed at the top of the inner wall of the carrier 140. In some embodiments, the overhangs 143 may be elongated protrusions. In some embodiments, the overhangs 143 may be rectangular. In some embodiments, the overhangs 143 may be adjacent to the top of the inner wall. In some embodiments, the center of each overhang 143 may be placed right above each guiderail 141. In some embodiments, there may be four guiderails 141 and four overhangs 143 corresponding to each overhang. In other embodiments, the number of guiderails 141 and overhangs 143 may differ. In some embodiments, the guiderails 141 and overhangs 143 may be evenly placed around a circumference of an axial cross-section of the carrier 120. In some embodiments, there may be a gap between the overhang 143 and a top of the guiderail 141. In some embodiments, there may be gaps between the overhangs 143.

Like the first segment 140, an outer wall of the second segment 160 may also include a plurality of pairs of knubs 161. In some embodiments, a plurality of pairs of knubs 161 may be placed near the bottom of the outer wall of the first segment 160. In some embodiments, the knubs 161 may be protrusions with rectangular shapes, with their width larger than their height. In some embodiments, there may be larger gaps between the pairs of knubs, and smaller gaps between the two knubs within a pair. In some embodiments, there may be four pairs of knubs 161, corresponding to the four overhangs 143 on the first segment 140, and the four guiderails 141.

During assembly, the movement of the second segment 160 with respect to the first segment 140 follows the broken line in FIG. 6B. In some embodiments, the gaps between the overhangs 143 may be larger than the width of a pair of knubs 161, so that the pairs of knubs may fit into the gaps between the overhangs during assembly. In some embodiments, when the second segment 160 is spined with regard to the first segment 140 during the assembly process, the knubs 161 click over the guiderails 141. In some embodiments, the gaps between the two knubs 161 in a pair may be slightly larger than the width of the guiderails 141, so that the guiderails may fit into the gap between the two knubs in a pair. Therefore, as discussed above, the interlocking structure formed by the knubs 161, and the guiderails 141 may ensure that the second segment 160 may move in the axial direction with regard to the first segment 140 but cannot spin with regard to the first segment.

Note that a person with ordinary skills in the art may modify this process. For example, the number of knubs, guiderails, and overhangs may be different. For example, the shapes of the knubs and overhangs may be different. For example, the guiderails may not be evenly placed along a circumference of an axial cross-section of the carrier. For example, there may be a gap between an overhang and the corresponding guiderail, and when an assembler spins the first segment with respect to the carrier, the knubs may move horizontally through the gap.

One of the processes as illustrated in FIG. 6A or 6B may apply to the assembly of the second segment 160 and the third segment 180.

Figure 7:
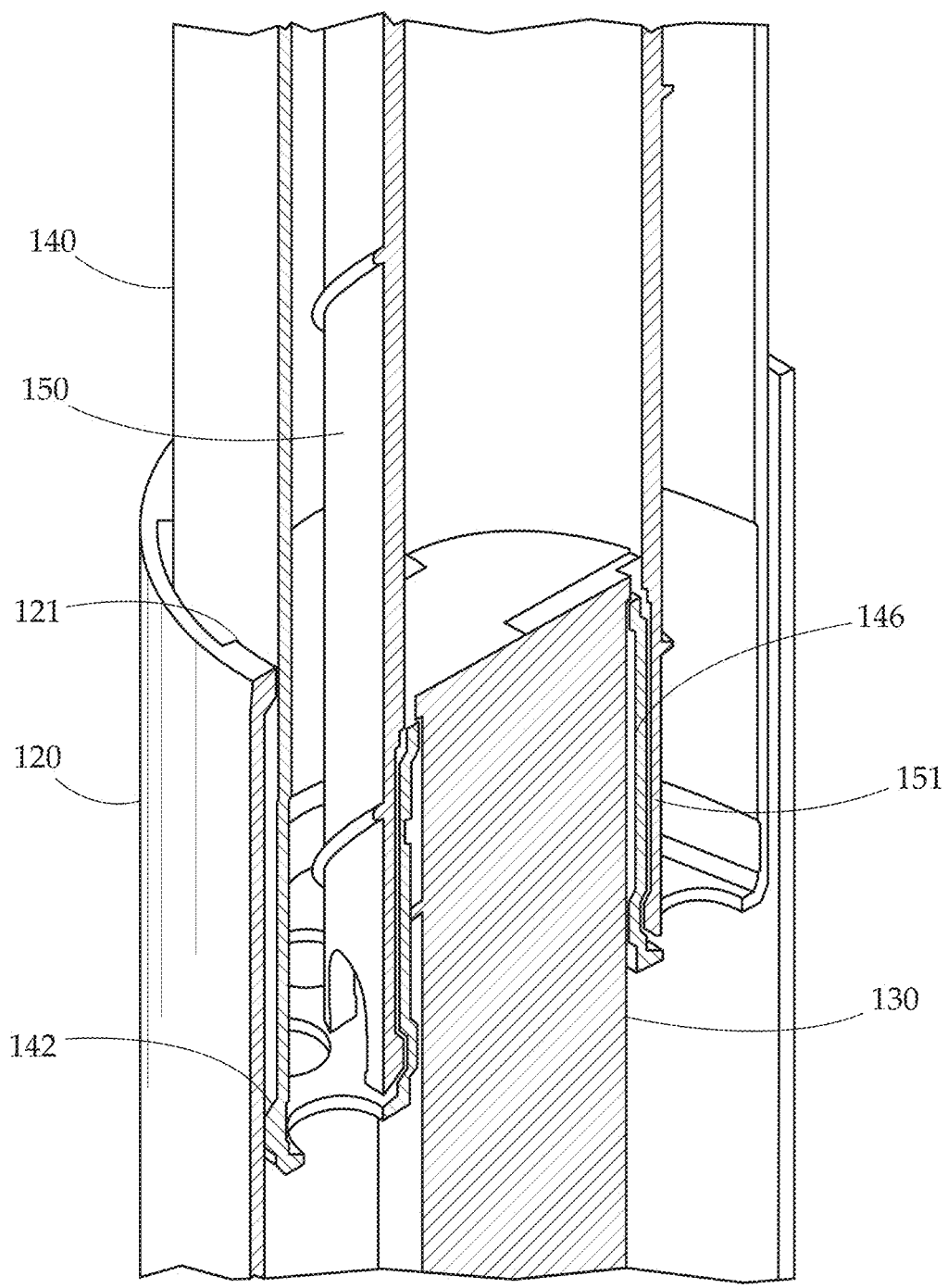
FIG. 7 is a lateral cross-sectional view diagram showing the connections between the carrier, drive segments, and screws, according to some embodiments of the presently disclosed technology.

FIG. 7 is a lateral cross-sectional view diagram showing the connections between the carrier, drive segments, and screws, according to some embodiments of the presently disclosed technology. FIG. 7 shows the connections between the first segment 140, the carrier 120, and the first drive screw 130. It illustrates two design features of the presently disclosed technology: (1) how minimizing the contact area between the first segment 140 and the carrier 120 can reduce friction; (2) how the clip assembly between the first segment 140 and the first drive screw 130 enables the first segment to spin with regard to the drive screw but prohibits the first segment to move in the axial direction with regard to the drive screw.

As discussed above, the first segment 140 may be connected with the carrier 120 in such a way that the first segment is able to move in the axial direction with respect to the carrier, but not able to spin. Also, when the first segment 140 is moving in the axial direction upward, it can only go as high as when there is a small overlap between the first segment and the carrier, then the overhangs 121 will block the knubs 142. Hence, the first segment 140 has no risk of getting detached from the carrier 120.

As illustrated in FIG. 7, the first segment 140 and the carrier 120 may make contact on two sets of protrusions: the overhangs 121 at the top of the inner walls of the carrier, and the knubs 142 near the bottoms of the outer walls of the first segment. The overhangs 121 and the knubs 142 have been discussed in detail in the previous paragraphs. The contact areas between the first segment 140 and the carrier 120, provided by the overhangs 121 and the knubs 142, are very small compared to the size of the carrier 120 and the first segment 140. Therefore, the friction is minimized between the first segment 140 and the carrier 120.

Also as discussed above, the first segment 140 may also include a first screw connector 145. The first screw connector 145 may have a much shorter tubular shape and may be placed inside the first segment 140, and co-axial with the first segment. A bottom of the first screw connector 145 may level with a bottom of the first segment 140, and the two bottoms may connect via a first circular bottom connector 149.

In the exemplary embodiment as shown in FIG. 7, the first segment 140 may be connected to the second drive screw 150 via a clip connection. In some embodiments, the clip connection is implemented with a protrusion on the first segment 140 and a recession on the second drive screw 150, but the clip connection may also be implemented in other ways. As discussed above, the clip connection enables the first segment 140 to spin with regard to the first drive screw 150 but ensures that the first segment 140 cannot move in the axial direction with regard to the first drive screw 150.

As illustrated in FIG. 7, in some embodiments, the first screw connector 145 may include a protrusion 146 on its outer wall. In the exemplary embodiment as illustrated in FIG. 7, the protrusion 146 is a wide stripe parallel to a bottom circumference of the first screw connector, whose width is almost as high as the height of the first screw connector 145. In the exemplary embodiment as illustrated in FIG. 7, the second drive screw 150 includes a corresponding recession 151 on its inner wall. In some embodiments, the recession 151 should be close to the bottom of the second drive screw 150, so that the bottom of the second drive screw almost levels with the bottom of the first segment 140 when the two pieces are assembled. In the exemplary embodiment as illustrated in FIG. 7, the width of the recession 151 may be slightly larger than the protrusion 146, so that the recession 151 and the protrusion 146 may fit together. When an assembler puts the first segment 140 and the second drive screw 150 together, the protrusion 146 and the recession 151 may click together, thus forming a secure connection.

In some embodiments, the connection between the first screw connector 145 and the second drive screw 150 may be realized by other means. For example, the first screw connector 145 may contain a recession on its outer wall, and the second drive screw 150 may contain a corresponding protrusion on its inner wall. For another example, the width of the recessions and protrusions may be smaller. For another example, the first screw connector 145 may contain a horizontal guiderail on its outer wall, and the second drive screw 150 may include knubs on its inner wall that can interlock with the guiderail. For yet another example, the outer wall of the first screw connector 145 and the inner wall of the second drive screw 150 may each contain a number of interlocking horizontal rails.

Additionally, in some embodiments, the first drive screw 130 may include one or more overhangs at its top, so that the one or more overhangs may cap the movement of the first segment 140 when the first segment reaches its topmost location.

Furthermore, unless explicitly stated in the claims, the use of order, numbers, letters, or other names for processing elements and sequences are not intended to limit the order of the processes and methods of the present disclosure. While various examples have been discussed in the disclosure as currently considered useful embodiments of the invention, it should be understood that such details are provided for illustrative purposes only. The appended claims are not limited to the disclosed embodiments, and instead, the claims are intended to cover all modifications and equivalent combinations within the scope and essence of the embodiments disclosed in the present disclosure. For example, although the described system components may be implemented through a hardware device, they may also be realized solely through a software solution, such as installing the described system on an existing processing or mobile device.

Similarly, it should be noted that, for the sake of simplifying the presentation of embodiments disclosed in the present disclosure and aiding in understanding one or more embodiments of the present disclosure, various features have been sometimes combined into a single embodiment, drawing, or description. However, this manner of disclosure does not imply that the features required by the claims are more than the features mentioned in the claims. In fact, the features of the embodiments are less than all the features of the single embodiment disclosed in the foregoing disclosure.

In some embodiments, numeric values describing the composition and quantity of attributes are used in the description. It should be understood that such numeric values used for describing embodiments may be modified with qualifying terms such as "about," "approximately" or "generally". Unless otherwise stated, "about," "approximately" or "generally" indicates that a variation of 20% is permitted in the described numbers. Accordingly, in some embodiments, the numerical parameters used in the disclosure and claims are approximations, which can change depending on the desired characteristics of the individual embodiment. In some embodiments, the numerical parameters should take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

In closing, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A 3D-printed telescoping actuator, comprising:
   a ring gear;
   wherein the ring gear is cylindrical;
   a carrier;
   wherein the carrier is hollow and cylindrical;
   wherein the carrier is coaxial with the ring gear;
   wherein the carrier is connected to the ring gear such that the carrier is able to rotate relative to the ring gear but unable to move in an axial direction relative to the ring gear;
   a first drive screw provided inside the carrier;
   wherein the first drive screw is cylindrical and coaxial with the carrier;
   wherein the first drive screw is connected to the ring gear such that the first drive screw is able to rotate with the ring gear and the carrier, but unable to move in the axial direction relative to the ring gear and the carrier;
   wherein the first drive screw is connected to the ring gear via one or more gears, such that the first drive screw is able to rotate relative to the carrier in response to rotation between the ring gear and the carrier;
   a first segment;
   wherein the first segment is cylindrical and coaxial with the carrier;
   wherein the first segment is connected to the carrier via one or more first guiderails on the carrier interlocking with one or more first pairs of knubs on the first segment such that the first segment is able to move in the axial direction relative to the carrier but unable to rotate relative to the carrier;
   wherein the first segment is connected to the first drive screw via a first pair of slopes or a first pair of one or more threads such that the first segment is able to move in an axial direction relative to the carrier in response to rotation between the first drive screw and the carrier;
   a second drive screw;
   wherein the second drive screw is cylindrical and coaxial with the carrier;
   wherein the second drive screw is connected to the first segment via a first recession and a matching first protrusion such that the second drive screw is able to rotate but unable to move in the axial direction relative to the first segment;
   a second segment;
   wherein the second segment is cylindrical and coaxial with the carrier;
   wherein the second segment is connected to the first segment via one or more second guiderails on the first segment interlocking with one or more second pairs of knubs on the second segment such that the second segment is able to move in the axial direction but unable to rotate relative to the first segment;
   wherein the second segment is connected to the second drive screw via a second pair of slopes or a second pair of one or more threads such that the second segment is able to move in an axial direction relative to the first segment in response to rotation between the second drive screw and the first segment;
   a third drive screw;
   wherein the third drive screw is cylindrical and coaxial with the carrier;
   wherein the third drive screw is connected to the second segment via a second recession and a matching second protrusion such that the third drive screw is able to rotate but unable to move in the axial direction relative to the second segment;
   a third segment;
   wherein the third segment is cylindrical and coaxial with the carrier;
   wherein the third segment is connected to the second segment via one or more third guiderails on the second segment interlocking with one or more third pairs of knubs on the third segment such that the third segment is able to move in the axial direction but unable to rotate relative to the second segment;
   wherein the third segment is connected to the third drive screw via a third pair of slopes or a third pair of one or more threads such that the third segment is able to move in an axial direction relative to the second segment in response to rotation between the third drive screw and the second segment;
   wherein the first drive screw, the second drive screw, and the third drive screw are interlocked together so that they are able to move in an axial direction but unable to rotate relative to each other;
   wherein the ring gear, the carrier, the first drive screw, the second drive screw, the third drive screw, the first segment, the second segment, and the third segment are 3D printed;
   wherein the first drive screw, the second drive screw, the third drive screw, the first segment, the second segment, and the third segment are made as consolidated single pieces.

2. The 3D-printed telescoping actuator of claim 1, wherein the one or more gears connect an inner wall of the ring gear and a connecting part of the first drive screw,
   wherein the inner wall includes a first plurality of teeth that interlock with the one or more gears,
   wherein the connecting part includes a second plurality of teeth interlocking with the one or more gears.

3. The 3D-printed telescoping actuator of claim 1, wherein the first drive screw, the second drive screw, and the third drive screw are interlocked together by a plurality of protrusions and recessions on surfaces of the first drive screw, the second drive screw, and the third drive screw.

4. The 3D-printed telescoping actuator of claim 1, wherein the carrier includes a grip and an inner carrier;
   wherein the grip is hollow and cylindrical, with a textured outer surface;
   wherein the inner carrier is cylindrical and provided within the grip;
   wherein the inner carrier is statically connected to the grip with friction.

5. The 3D-printed telescoping actuator of claim 4, wherein the inner carrier includes a bottom with one or more air holes.

6. The 3D-printed telescoping actuator of claim 1, wherein the first segment includes a first screw connector,
   wherein the first screw connector is hollow and cylindrical;

wherein a bottom circumference of the first screw connector is aligned with a bottom circumference of the first segment;
wherein an inner wall of the first screw connector includes one slope of the first pair of slopes.

7. The 3D-printed telescoping actuator of claim 6, wherein an outer wall of the first drive screw includes another slope in the first pair of slopes, wherein the first pair of slopes fit together.

8. The 3D-printed telescoping actuator of claim 6, wherein the first protrusion is placed on an outer wall of the first screw connector and the first recession is placed on an inner wall of the second screw, wherein the first protrusion and the first recession are able to clip together.

9. The 3D-printed telescoping actuator of claim 8, wherein the protrusion is shaped as a stripe parallel to a bottom circumference of the first screw connector.

10. The 3D-printed telescoping actuator of claim 6, wherein the first screw connector is coaxial with the first segment and connected to the first segment via a first bottom.

11. The 3D-printed telescoping actuator of claim 10, wherein the first bottom includes one or more air holes.

12. The 3D-printed telescoping actuator of claim 1, wherein the one or more first guiderails are linear protrusions parallel to the axial direction on an inner wall of the carrier and interlock with the one or more first pairs of knubs on an outer wall of the first segment.

13. The 3D-printed telescoping actuator of claim 12, wherein the inner wall of the carrier includes one or more first overhangs provided above each of the one or more first guiderails,
wherein the one or more first overhangs protrude from the inner wall.

14. The 3D-printed telescoping actuator of claim 13, wherein there are no gaps between the one or more first overhangs and tops of the one or more first guiderails.

15. The 3D-printed telescoping actuator of claim 13, wherein first horizontal gaps are provided between the one or more overhangs and a width of the first horizontal gaps is larger than a width of each of the first pair of knubs.

16. The 3D-printed telescoping actuator of claim 15, wherein the one or more first pairs of knubs are able to slide through the first horizontal gaps during assembly.

17. The 3D-printed telescoping actuator of claim 13, wherein first vertical gaps are provided between the one or more first overhangs and a top of the one or more first guiderails, and a height of the first vertical gaps is larger than a height of each of the one or more first pairs of knubs.

18. The 3D-printed telescoping actuator of claim 17, wherein the one or more first pairs of knubs are able to slide through the first vertical gaps during assembly.

19. The 3D-printed telescoping actuator of claim 17, wherein the one or more first pairs of knubs are able to deform over the one or more first guiderails during assembly.

* * * * *